United States Patent
Kato et al.

(10) Patent No.: US 12,284,096 B2
(45) Date of Patent: Apr. 22, 2025

(54) DETECTION DEVICE, MANAGEMENT DEVICE, DETECTION METHOD, AND DETECTION PROGRAM

(71) Applicant: SUMITOMO ELECTRIC INDUSTRIES, LTD., Osaka (JP)

(72) Inventors: Isao Kato, Osaka (JP); Takanori Miyoshi, Osaka (JP); Satoru Sakurazawa, Osaka (JP); Yoichi Hata, Osaka (JP); Takumi Asaina, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 370 days.

(21) Appl. No.: 17/786,063

(22) PCT Filed: Sep. 10, 2020

(86) PCT No.: PCT/JP2020/034296
§ 371 (c)(1),
(2) Date: Jun. 16, 2022

(87) PCT Pub. No.: WO2021/152900
PCT Pub. Date: Aug. 5, 2021

(65) Prior Publication Data
US 2023/0022923 A1    Jan. 26, 2023

(30) Foreign Application Priority Data
Jan. 28, 2020   (JP) ................. 2020-011285

(51) Int. Cl.
*H04L 43/08* (2022.01)
*H04L 12/40* (2006.01)
*G06F 21/55* (2013.01)

(52) U.S. Cl.
CPC .............. *H04L 43/08* (2013.01); *H04L 12/40* (2013.01); *G06F 21/554* (2013.01)

(58) Field of Classification Search
CPC ... G06F 21/554; H04L 12/40; H04L 12/4625; H04L 2012/40273; H04L 43/08
See application file for complete search history.

(56) References Cited

U.S. PATENT DOCUMENTS

2008/0043629 A1*  2/2008  Hofman ................. H04L 43/50
                                                         370/242
2013/0136007 A1*  5/2013  Jiang ................... H04L 41/0677
                                                         370/242

(Continued)

FOREIGN PATENT DOCUMENTS

JP    2014187542 A   * 10/2014
JP    2018052378 A   *  4/2018

(Continued)

OTHER PUBLICATIONS

Atobe et al.;"A Consideration on Unauthorized Device Detection Using TDR;" 2019 Symposium on Cryptography and Information Security, The Institute of Electronics, Information and Communication Engineers; 2019.

*Primary Examiner* — Shah M Rahman
(74) *Attorney, Agent, or Firm* — Oliff PLC

(57) ABSTRACT

A detection device includes: a switch provided to a transmission path that connects a plurality of function units to each other; a measurement unit configured to measure a signal that passes the transmission path, at a first node on a first end side of the switch and at a second node on a second end side of the switch; and a detection unit configured to compare a measurement result at the first node and a measurement result at the second node, which are obtained by the measurement unit, with a reference measurement result which is a measurement result for reference, and detect abnormality regarding the transmission path, based on a result of the comparison.

8 Claims, 11 Drawing Sheets

(56) References Cited

U.S. PATENT DOCUMENTS

| | | | |
|---|---|---|---|
| 2016/0255423 A1* | 9/2016 | Suzuki | H04Q 9/00 |
| | | | 340/870.16 |
| 2018/0069874 A1* | 3/2018 | Saeki | H04L 12/40 |
| 2018/0294991 A1* | 10/2018 | Tsurumi | B60R 25/00 |
| 2018/0372807 A1* | 12/2018 | Krieger | G01R 31/40 |
| 2019/0141070 A1* | 5/2019 | Tsurumi | B60R 16/0232 |
| 2019/0342115 A1* | 11/2019 | Lieder | H04L 43/08 |
| 2020/0313927 A1* | 10/2020 | Kaku | H04B 7/14 |
| 2021/0097210 A1 | 4/2021 | Atobe | |
| 2021/0159972 A1* | 5/2021 | Matsumoto | H04B 10/0771 |
| 2021/0243049 A1* | 8/2021 | Kuwata | H04L 12/40097 |
| 2023/0010621 A1* | 1/2023 | Isoyama | H04L 12/40 |

FOREIGN PATENT DOCUMENTS

| | | | |
|---|---|---|---|
| WO | 2017/047469 A1 | 3/2017 | |
| WO | WO-2019049285 A1 * | 3/2019 | G06F 11/3058 |

\* cited by examiner

DETECTION DEVICE, MANAGEMENT DEVICE, DETECTION METHOD, AND DETECTION PROGRAM

TECHNICAL FIELD

The present disclosure relates to a detection device, a management device, a detection method, and a detection program.

This application claims priority on Japanese Patent Application No. 2020-11285 filed on Jan. 28, 2020, the entire content of which is incorporated herein by reference.

BACKGROUND ART

PATENT LITERATURE 1 (US Patent Application Publication No. 2008/0043629) discloses a detection method as follows. That is, the detection method is for detecting a failure of a network component having a failure in a bus network including two or more transmitters, and includes a step of transmitting a first signal of a predetermined parameter from a first transmitter, out of the two or more transmitters, to the bus network; a step of receiving the first signal by at least one receiver; and a step of determining whether the first signal is followed by a first tail that is an echo indicating a network component having a failure.

Meanwhile, NON PATENT LITERATURE 1 (Yuta Atobe and three others, "TDR wo motiita husei kikino shasainettowa-ku setuzoku kenti ni kansuru itikentou" (provisional translation: A study on detection of in-vehicle network connection of unauthorized apparatuses by using TDR), 2019 Symposium on Cryptography and Information Security, The Institute of Electronics, Information and Communication Engineers) discloses a technology in which impedance of a network is observed by using a TDR (Time Domain Reflectometry) technology, whereby a connection of an unauthorized apparatus is detected.

CITATION LIST

Patent Literature

PATENT LITERATURE 1: US Patent Application Publication No. 2008/0043629

Non Patent Literature

NON PATENT LITERATURE 1: Yuta Atobe and three others, "A Study on Detecting In-Vehicle Network Connections of Unauthorized Devices Using TDR", 2019 Symposium on Cryptography and Information Security, The Institute of Electronics, Information and Communication Engineers

SUMMARY OF THE INVENTION

A detection device according to the present disclosure includes: a switch provided to a transmission path that connects a plurality of function units to each other; a measurement unit configured to measure a signal that passes the transmission path, at a first node on a first end side of the switch and at a second node on a second end side of the switch; and a detection unit configured to compare a measurement result at the first node and a measurement result at the second node, which are obtained by the measurement unit, with a reference measurement result which is a measurement result for reference, and detect abnormality regarding the transmission path, based on a result of the comparison.

A management device according to the present disclosure includes: an acquisition unit configured to acquire measurement results of a signal, which passes a transmission path, measured at a first node on a first end side of a switch and at a second node on a second end side of the switch, the transmission path connecting a plurality of function units to each other, the switch being provided to the transmission path; and a detection unit configured to compare the measurement result at the first node and the measurement result at the second node, which are obtained by the acquisition unit, with a reference measurement result which is a measurement result for reference, and detect abnormality regarding the transmission path, based on a result of the comparison.

A detection method according to the present disclosure is a detection method used in a detection device including a switch provided to a transmission path that connects a plurality of function units to each other. The method includes: measuring a signal that passes the transmission path, at a first node on a first end side of the switch and at a second node on a second end side of the switch; and comparing a measurement result at the first node and a measurement result at the second node with a reference measurement result which is a measurement result for reference, and detecting abnormality regarding the transmission path, based on a result of the comparison.

A detection method according to the present disclosure is a detection method used in a management device. The method includes: acquiring measurement results of a signal, which passes a transmission path, measured at a first node on a first end side of a switch and at a second node on a second end side of the switch, the transmission path connecting a plurality of function units to each other, the switch being provided to the transmission path; and comparing the measurement result acquired at the first node and the measurement result acquired at the second node with a reference measurement result which is a measurement result for reference, and detecting abnormality regarding the transmission path, based on a result of the comparison.

A detection program according to the present disclosure is used in a detection device including a switch provided to a transmission path that connects a plurality of function units to each other. The program causes a computer to function as: a measurement unit configured to measure a signal that passes the transmission path, at a first node on a first end side of the switch and at a second node on a second end side of the switch; and a detection unit configured to compare a measurement result at the first node and a measurement result at the second node, which are obtained by the measurement unit, with a reference measurement result which is a measurement result for reference, and detect abnormality regarding the transmission path, based on a result of the comparison.

One mode of the present disclosure can be realized not only as a detection device that includes such a characteristic processing unit but also as a semiconductor integrated circuit that realizes a part or the entirety of the detection device, or as a detection system including the detection device. One mode of the present disclosure can be realized not only as a management device that includes such a characteristic processing unit, but also as a semiconductor integrated circuit that realizes a part or the entirety of the management device, or as a detection system including the management device.

DETAILED DESCRIPTION

Figure 1:
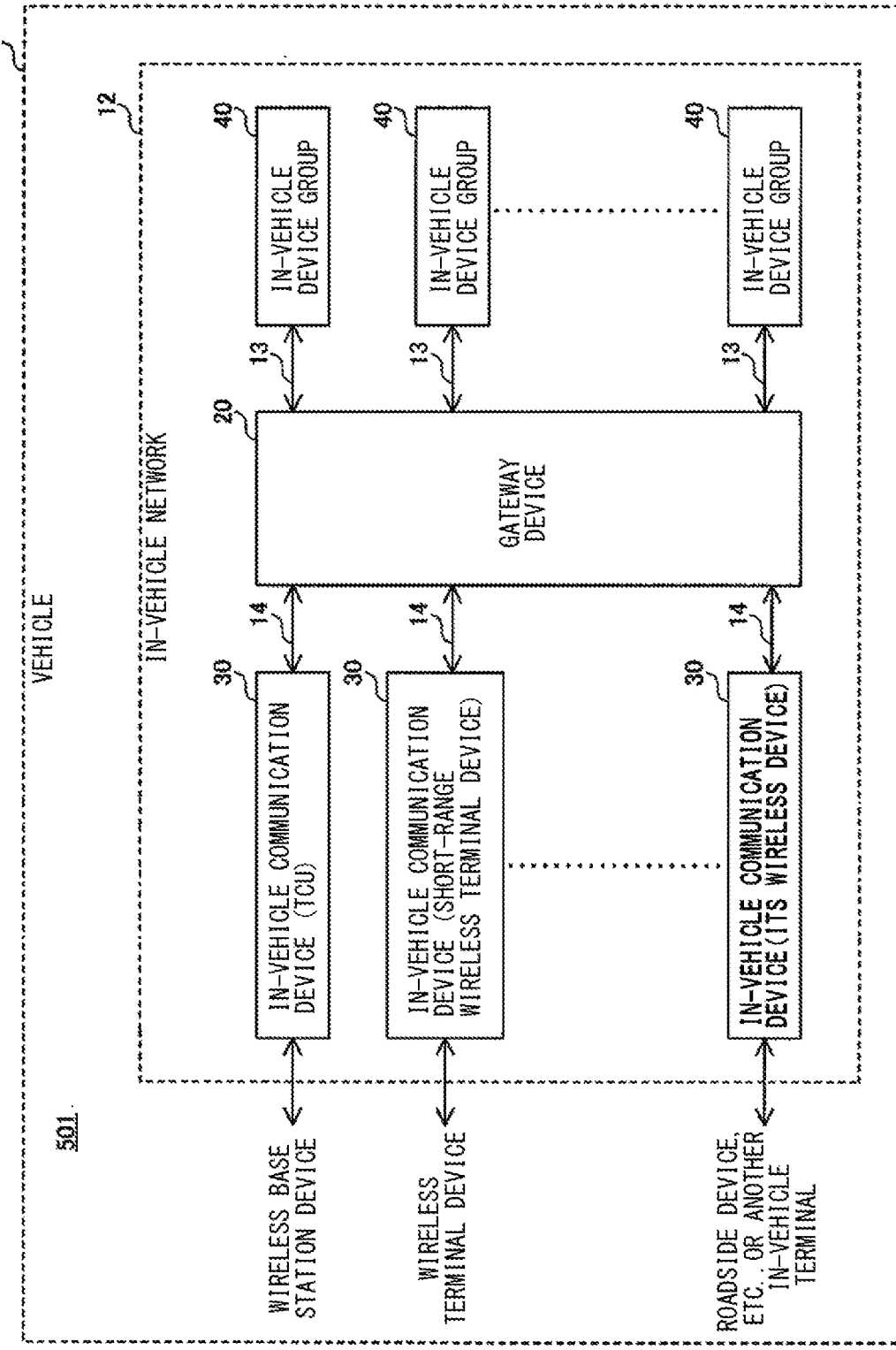
FIG. 1 shows a configuration of a communication system according to a first embodiment of the present disclosure.

To date, technologies for improving security in networks have been developed.

Problem to be Solved by the Present Disclosure

Beyond the technology described in PATENT LITERATURE 1, there is a demand for a technology that can realize an excellent function regarding security in a network.

The present disclosure has been made in order to solve the above problem. An object of the present disclosure is to provide a detection device, a management device, a detection method, and a detection program that can realize an excellent function regarding security in a network.

Effect of the Present Disclosure

According to the present disclosure, it is possible to realize an excellent function regarding security in a network.

DESCRIPTION OF EMBODIMENT OF THE PRESENT DISCLOSURE

First, contents of embodiments of the present disclosure are listed and described.

(1) A detection device according to an embodiment of the present disclosure includes: a switch provided to a transmission path that connects a plurality of function units to each other; a measurement unit configured to measure a signal that passes the transmission path, at a first node on a first end side of the switch and at a second node on a second end side of the switch; and a detection unit configured to compare a measurement result at the first node and a measurement result at the second node, which are obtained by the measurement unit, with a reference measurement result which is a measurement result for reference, and detect abnormality regarding the transmission path, based on a result of the comparison.

In the above configuration, abnormality regarding the transmission path is detected by using the signal measurement results at the first node on the first end side of the switch and at the second node on the second end side of the switch. Therefore, for example, after startup of the network with validities of the function units having been judged and the switches having been turned on, connection of new equipment to the transmission path, physical abnormality of the transmission path itself, and the like can be more accurately detected by using a difference between the measurement result at the first node and the measurement result at the second node. Therefore, it is possible to realize an excellent function regarding security of the network.

(2) Preferably, the reference measurement result is a measurement result obtained in the past by the measurement unit.

In the above configuration, abnormality regarding the transmission path can be detected in consideration of change in the measurement results due to aging deterioration of the transmission path.

(3) Preferably, the detection unit detects abnormality regarding the transmission path, further based on a transmission direction, of the signal in the transmission path, which is determined based on the measurement results obtained by the measurement unit.

In the above configuration, abnormality in the transmission path can be more accurately detected by using the signal transmission direction determined by using the measurement results at the first node and the second node, for example.

(4) Preferably, the detection unit detects abnormality regarding the transmission path, further based on measurement results, of a signal that passes a second transmission path, obtained at a first node on a first end side of a second switch and at a second node on a second end side of the second switch that is provided to the second transmission path that connects a plurality of function units to each other.

In the above configuration, an abnormal spot can be more precisely estimated in the transmission path including branch lines, for example.

(5) Preferably, the detection device includes a plurality of the switches, and further includes control units configured to control the respective switches. In a case where abnormality regarding the transmission path has been detected by the detection unit, based on the comparison result regarding any one of the respective switches, the control units turn off one or a plurality of switches among the respective switches.

In the above configuration, an unauthorized function unit can be isolated from the transmission path, or communication between function units can be performed while bypassing a spot where abnormality has been detected.

(6) A management device according to the present invention includes: an acquisition unit configured to acquire measurement results of a signal, which passes a transmission path, measured at a first node on a first end side of a switch and at a second node on a second end side of the switch, the transmission path connecting a plurality of function units to each other, the switch being provided to the transmission path; and a detection unit configured to compare the measurement result at the first node and the measurement result at the second node, which are obtained by the acquisition unit, with a reference measurement result which is a measurement result for reference, and detect abnormality regarding the transmission path, based on a result of the comparison.

In the above configuration, abnormality regarding the transmission path is detected by using the signal measurement results at the first node on the first end side of the switch and at the second node on the second end side of the switch. Therefore, for example, after startup of the network with validities of the function units having been judged and the switches having been turned on, connection of new equipment to the transmission path, physical abnormality of the transmission path itself, and the like can be more accurately detected by using a difference between the measurement result at the first node and the measurement result at the second node. Therefore, it is possible to realize an excellent function regarding security of the network.

(7) A detection method according to the embodiment of the present disclosure is a detection method used in a detection device including a switch provided to a transmission path that connects a plurality of function units to each other. The method includes: measuring a signal that passes the transmission path, at a first node on a first end side of the switch and at a second node on a second end side of the switch; and comparing a measurement result at the first node and a measurement result at the second node with a reference measurement result which is a measurement result for reference, and detecting abnormality regarding the transmission path, based on a result of the comparison.

In the above method, abnormality regarding the transmission path is detected by using the signal measurement results at the first node on the first end side of the switch and at the second node on the second end side of the switch. Therefore, for example, after startup of the network with validities of the function units having been judged and the switches having been turned on, connection of new equipment to the transmission path, physical abnormality of the transmission path itself, and the like can be more accurately detected by using a difference between the measurement result at the first node and the measurement result at the second node. Therefore, it is possible to realize an excellent function regarding security of the network.

(8) A detection method according to the embodiment of the present disclosure is a detection method used in a management device. The method includes: acquiring measurement results of a signal, which passes a transmission path, measured at a first node on a first end side of a switch and at a second node on a second end side of the switch, the transmission path connecting a plurality of function units to each other, the switch being provided to the transmission path; and comparing the measurement result acquired at the first node and the measurement result acquired at the second node with a reference measurement result which is a measurement result for reference, and detecting abnormality regarding the transmission path, based on a result of the comparison.

In the above method, abnormality regarding the transmission path is detected by using the signal measurement results at the first node on the first end side of the switch and at the second node on the second end side of the switch. Therefore, for example, after startup of the network with validities of the function units having been judged and the switches having been turned on, connection of new equipment to the transmission path, physical abnormality of the transmission path itself, and the like can be more accurately detected by using a difference between the measurement result at the first node and the measurement result at the second node. Therefore, it is possible to realize an excellent function regarding security of the network.

(9) A detection program according to the embodiment of the present disclosure is used in a detection device including a switch provided to a transmission path that connects a plurality of function units to each other. The program causes a computer to function as: a measurement unit configured to measure a signal that passes the transmission path, at a first node on a first end side of the switch and at a second node on a second end side of the switch; and a detection unit configured to compare a measurement result at the first node and a measurement result at the second node, which are obtained by the measurement unit, with a reference measurement result which is a measurement result for reference, and detect abnormality regarding the transmission path, based on a result of the comparison.

In the above configuration, abnormality regarding the transmission path is detected by using the signal measurement results at the first node on the first end side of the switch and at the second node on the second end side of the switch. Therefore, for example, after startup of the network with validities of the function units having been judged and the switches having been turned on, connection of new equipment to the transmission path, physical abnormality of the transmission path itself, and the like can be more accurately detected by using a difference between the measurement result at the first node and the measurement result at the second node. Therefore, it is possible to realize an excellent function regarding security of the network.

Hereinafter, embodiments of the present disclosure are described with reference to the drawings. In the drawings, the same or corresponding parts are denoted by the same reference signs, and descriptions thereof are not repeated. At least some parts of the embodiments described below can be combined together as desired.

First Embodiment

[Configuration and Basic Operation]

FIG. 1 shows a configuration of a communication system according to a first embodiment of the present disclosure.

With reference to FIG. 1, a communication system 501 includes a gateway device 20, a plurality of in-vehicle communication devices 30, and a plurality of in-vehicle device groups 40.

The communication system 501 is mounted in a vehicle 1, for example. The communication system 501 may be used for a home network or factory automation.

An in-vehicle network 12 includes the gateway device 20 and transmission lines 13, 14.

The plurality of in-vehicle communication devices 30 are connected to the gateway device 20 via corresponding transmission lines 14. Each transmission line 14 is an Ethernet (registered trademark) cable, for example.

The in-vehicle communication devices 30 communicate with devices outside the vehicle 1, for example. Specifically, the in-vehicle communication devices 30 are a TCU (Telematics Communication Unit), a short-range wireless terminal device, and an ITS (Intelligent Transport Systems) wireless device, for example.

The plurality of in-vehicle device groups 40 are connected to the gateway device 20 via corresponding transmission lines 13. Each transmission line 13 is a transmission line according to, for example, a standard of CAN (Controller Area Network) (registered trademark), FlexRay (registered trademark), MOST (Media Oriented Systems Transport) (registered trademark), Ethernet, LIN (Local Interconnect Network), or the like.

Figure 2:
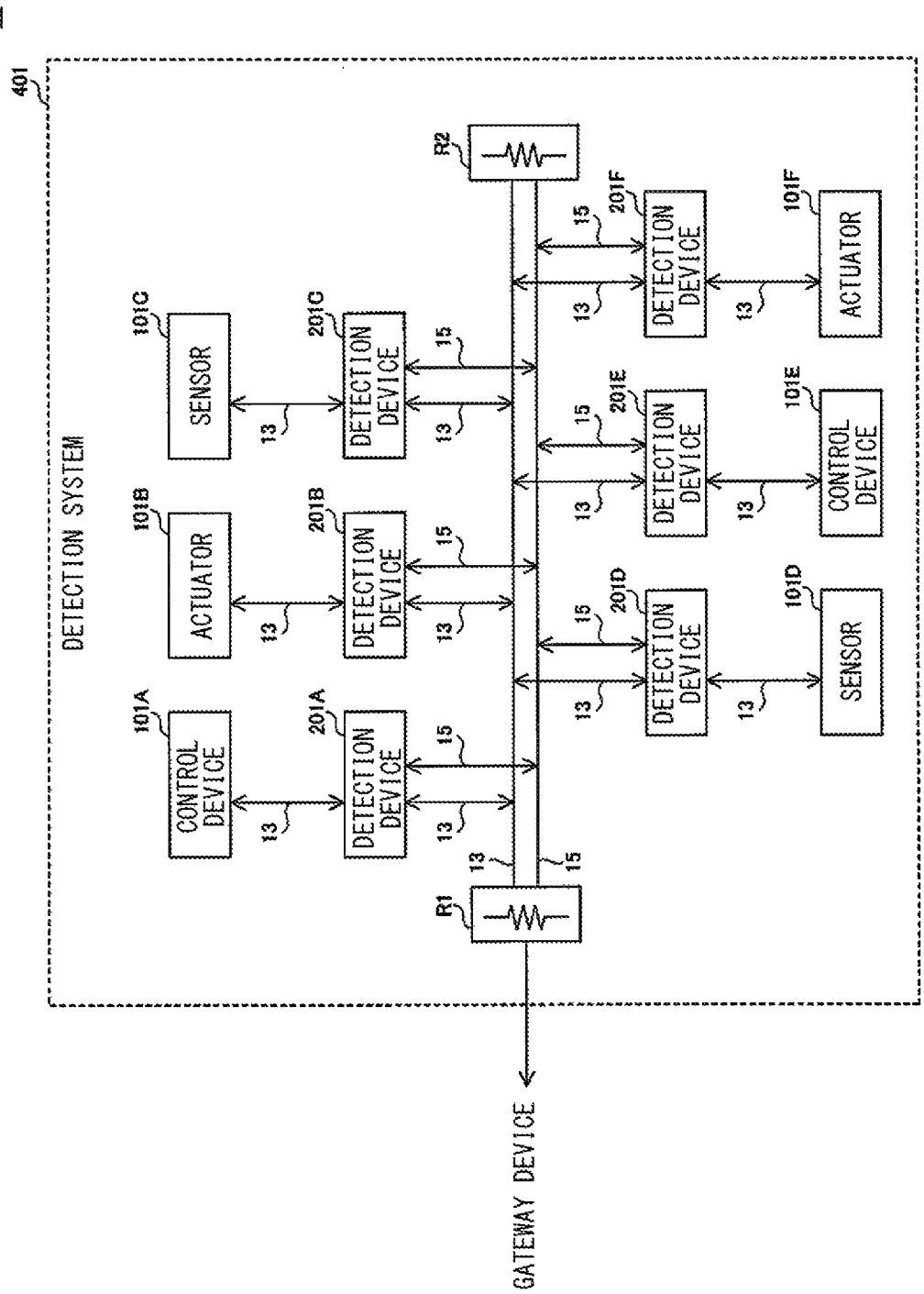
FIG. 2 shows a configuration of an in-vehicle device group according to the first embodiment of the present disclosure.

FIG. 2 shows a configuration of an in-vehicle device group according to the first embodiment of the present disclosure.

With reference to FIG. 2, the in-vehicle device group 40 is connected to the gateway device 20 via a corresponding bus, according to the CAN standard, which is an example of the transmission line 13.

The in-vehicle device group 40 includes a detection system 401. The detection system 401 includes detection devices 201A, 201B, 201C, 201D, 201E, 201F connected to transmission lines 13 and transmission lines 15, control devices 101A, 101E, actuators 101B, 101F, and sensors 101C, 101D. Hereinafter, each of the detection devices 201A, 201B, 201C, 201D, 201E, 201F is also referred to as a detection device 201.

The gateway device 20, the in-vehicle communication devices 30, the control devices 101A, 101E, the actuators 101B, 101F, and the sensors 101C, 101D are examples of in-vehicle devices. The control devices 101A, 101E, the actuators 101B, 101F, and the sensors 101C, 101D are examples of function units. Hereinafter, each of the control devices 101A, 101E, the actuators 101B, 101F, and the sensors 101C, 101D is also referred to as a function unit 101.

First ends of the transmission lines 13, 15 are connected to the gateway device 20 via a terminating resistor R1. Second ends of the transmission lines 13, 15 are connected to a terminating resistor R2. The transmission lines 13, 15 have a plurality of branch lines, and a detection device 201 is connected to each branch line.

To each detection device 201, a function unit 101 can be connected via a transmission line 13. In the example shown in FIG. 2, the control device 101A is connected to the detection device 201A, the actuator 101B is connected to the detection device 201B, the sensor 101C is connected to the detection device 201C, the sensor 101D is connected to the detection device 201D, the control device 101E is connected to the detection device 201E, and the actuator 101F is connected to the detection device 201F.

Although the detection devices 201 can be connected to the function units 101 via the transmission line 13, the present disclosure is not limited thereto. Each detection device 201 may be provided to a connector that connects the transmission line 13 and the corresponding function unit 101. In this case, when the connector is fitted to the function unit 101, the detection device 201 is electrically connected to the function unit 101.

The function unit 101 connected to the detection device 201 communicates with another in-vehicle device connected to the in-vehicle network 12, via the transmission line 13. For example, the function unit 101 transmits a signal including various kinds of information to another function unit 101 via the transmission line 13.

The detection device 201 communicates with another detection device 201 via the transmission line 15. The transmission line 15 is a power supply line, for example.

The control device 101A is an ECU (Electronic Control Unit), for example. The in-vehicle device group 40 may not necessarily include a plurality of function units 101, and may include one function unit 101. Some of the function units 101 in the in-vehicle device group 40 may be directly connected to the transmission lines 13 instead of being connected to the detection devices 201.

The transmission lines 13 are provided for different types of systems, for example. Specifically, the transmission lines 13 are implemented as a drive-related bus, a chassis/safety-related bus, a body/electrical-equipment-related bus, and an AV/information-related bus, for example.

An engine control device, an AT (Automatic Transmission) control device, and an HEV (Hybrid Electric Vehicle) control device, which are examples of the function unit 101, are connected to the detection devices 201 in the drive-related bus. The engine control device, the AT control device, and the HEV control device control an engine, an AT, and switching between the engine and a motor, respectively.

A brake control device, a chassis control device, and a steering control device, which are examples of the function unit 101, are connected to the detection devices 201 in the chassis/safety-related bus. The brake control device, the chassis control device, and the steering control device control a brake, a chassis, and steering, respectively.

An instrument indication control device, an air conditioner control device, a burglar prevention control device, an air bag control device, and a smart entry control device, which are examples of the function unit 101, are connected to the detection devices 201 in the body/electrical-equipment-related bus. The instrument indication control device, the air conditioner control device, the burglar prevention control device, the air bag control device, and the smart entry control device control instruments, an air conditioner, a burglar prevention mechanism, an air bag mechanism, and smart entry, respectively.

A navigation control device, an audio control device, an ETC (Electronic Toll Collection System) (registered trademark) control device, and a telephone control device, which are examples of the function unit 101, are connected to the detection devices 201 in the AV/information-related bus. The navigation control device, the audio control device, the ETC control device, and the telephone control device control a navigation device, an audio device, an ETC device, and a mobile phone, respectively.

The gateway device 20 is a central gateway (CGW), for example, and can communicate with other in-vehicle devices.

The gateway device 20 performs a relay process of relaying information transmitted/received between the in-vehicle device groups 40 connected to different transmission lines 13 via the corresponding detection devices 201 in the vehicle 1, information transmitted/received between in-vehicle communication devices 30, and information transmitted/received between an in-vehicle device group 40 and an in-vehicle communication device 30.

[Detection Device]

Figure 3:
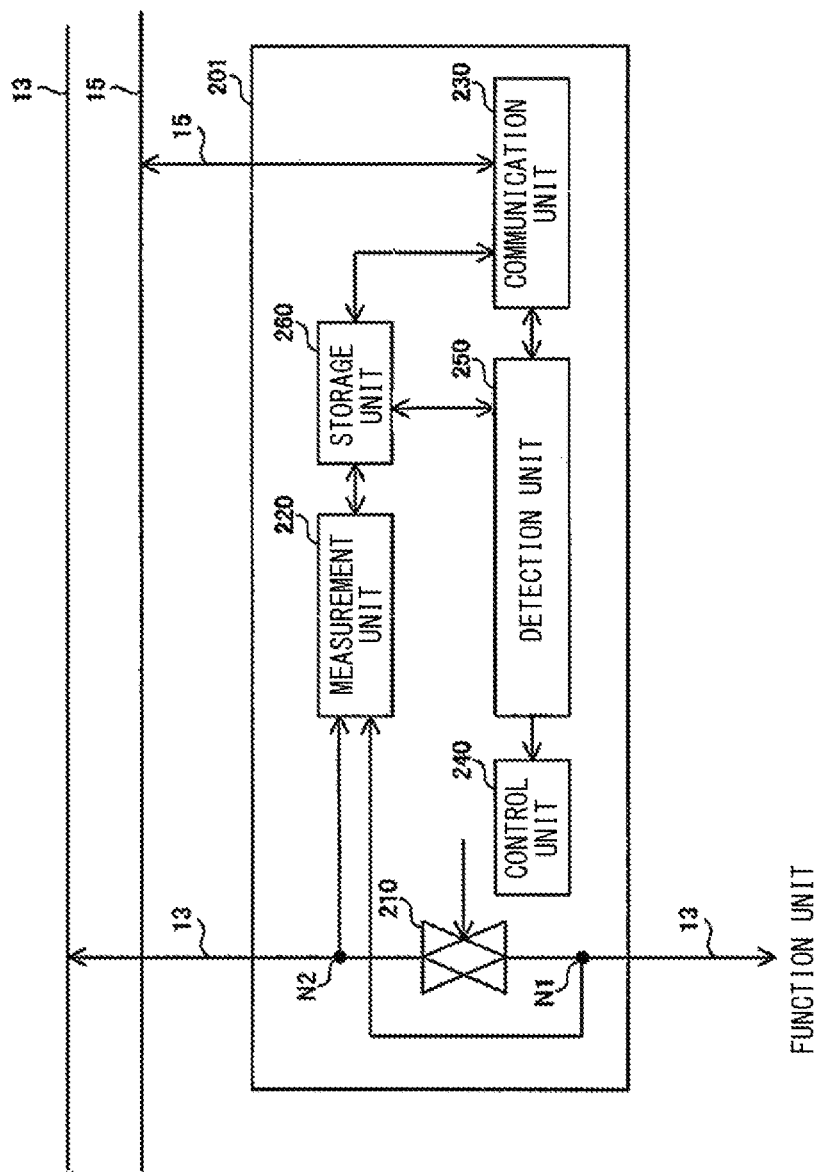
FIG. 3 shows a configuration of a detection device according to the first embodiment of the present disclosure.

FIG. 3 shows a configuration of a detection device according to the first embodiment of the present disclosure.

With reference to FIG. 3, the detection device 201 includes a switch 210, a measurement unit 220, a communication unit 230, a control unit 240, a detection unit 250, and a storage unit 260.

The measurement unit 220, the communication unit 230, the control unit 240, and the detection unit 250 are each realized by a processor such as a CPU (Central Processing Unit) or a DSP (Digital Signal Processor), for example. The storage unit 260 is a nonvolatile memory, for example.

The switch 210 is provided to a transmission path that connects a plurality of function units 101 to each other. More specifically, a first end of the switch 210 is connected to a function unit 101 corresponding to the detection device 201 via the transmission line 13. A second end of the switch 210 is connected to another function unit 101 via the transmission line 13 and another detection device 201. The switch 210 is an analog switch, for example.

The switch 210 is provided to the transmission line 13 in order to improve security of the in-vehicle network 12. For example, a determination device (not shown) determines validity of the function unit 101 in some way when the communication system 501 is started. The switch 210 is in its off state when the communication system 501 is started. When the determination device has determined that the function unit 101 is valid, the switch 210 is turned on according to a control signal transmitted from the determination device to the control unit 240, for example.

[Measurement Unit]

The measurement unit 220 measures a signal passing the transmission path, at a first node on a first end side of the switch 210 and at a second node on a second end side of the switch 210. The measurement unit 220 may be realized by one measuring instrument that measures, at the first node and the second node, the signal passing the transmission path, or may be realized by a first measurement instrument that measures, at the first node, the signal passing the transmission path and a second measurement instrument that measures, at the second node, the signal passing the transmission path.

More specifically, the measurement unit 220 measures a waveform of a signal that passes a node N1 in the transmission line 13 to which the first end of the switch 210 is connected, and a waveform of the signal that passes a node N2 in the transmission line 13 to which the second end of the switch 210 is connected. The node N1 is an example of the first node, and the node N2 is an example of the second node.

For example, the measurement unit 220 measures the waveform of the signal passing the node N1 by sampling a voltage at the node N1 in accordance with a predetermined sampling cycle. Likewise, the measurement unit 220 measures the waveform of the signal passing the node N2 by sampling a voltage at the node N2 in accordance with a predetermined sampling cycle.

Specifically, for example, the measurement unit 220 includes a sample-and-hold circuit, an amplifier, and an AD converter. The measurement unit 220 removes an offset of a DC component or the like from an analog voltage at the node N1, N2, amplifies the analog voltage, and samples the amplified analog voltage.

The measurement unit 220 stores, in the storage unit 260, sampling data S1 of the voltage at the node N1 and sampling data S2 of the voltage at the node N2.

[Detection Unit]

The detection unit 250 compares a measurement result at the node N1 and a measurement result at the node N2, which are obtained by the measurement unit 220, with a reference measurement result which is a measurement result for reference, and detects abnormality regarding the transmission path, based on the comparison result.

For example, the detection unit 250 performs an arithmetic operation using the sampling data S1, S2 stored in the storage unit 260 by the measurement unit 220 to calculate a feature amount of the signal passing the transmission line 13.

Figure 4:
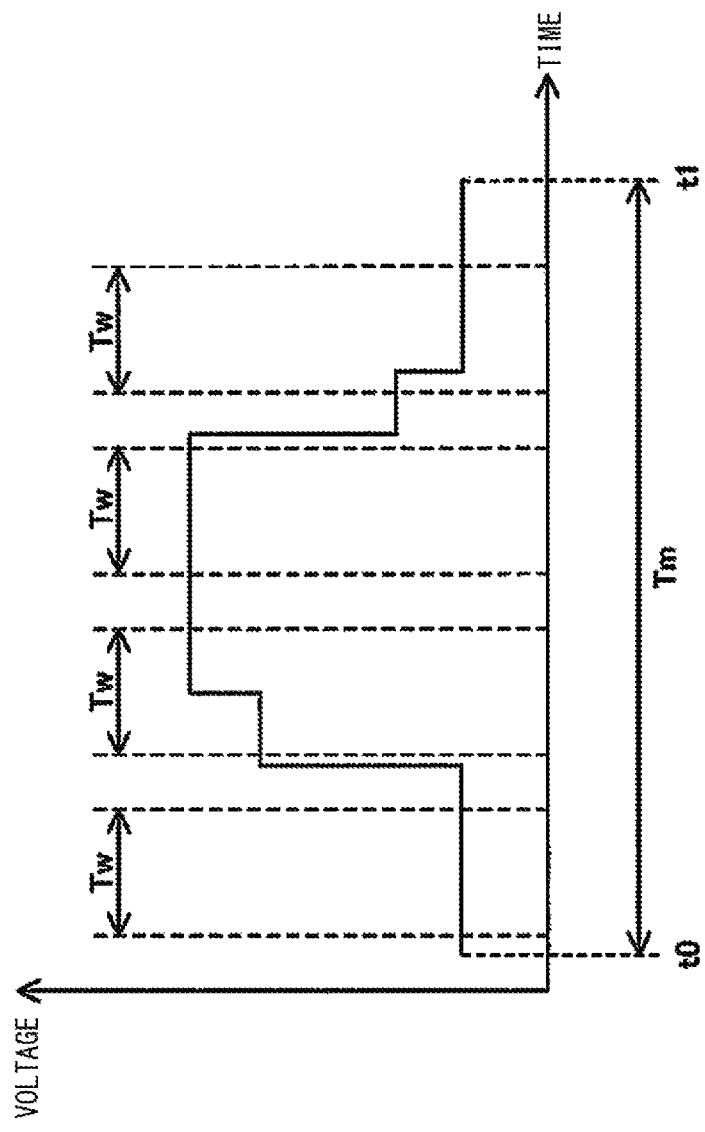
FIG. 4 shows an example of a waveform of a signal measured by the detection device according to the first embodiment of the present disclosure.

FIG. 4 shows an example of a waveform of a signal that is measured in the detection device according to the first embodiment of the present disclosure. FIG. 4 shows a waveform of a signal that passes the node N1, for example.

With reference to FIG. 4, for example, the detection unit 250 sets, in a predetermined target period Tm, a plurality of time observation windows each having a time interval Tw. Then, the detection unit 250 extracts, out of the sampling data S1, S2, a plurality of pieces of sampling data S1, S2 in the respective time observation windows, and integrates the extracted sampling data S1, S2 while multiplying the sampling data S1, S2 by a predetermined weight function.

The detection unit 250 can set the length of the time interval Tw. For example, the detection unit 250, by using the time observation windows, extracts a part, of the waveform of the signal passing the transmission line 13, which is irrelevant to the logic of communication data. More specifically, the detection unit 250 sets the length of the time interval Tw so as to extract a part other than a rising part and a falling part of the waveform.

The detection unit 250 calculates a difference D between a value calculated by integrating the extracted sampling data S1 while multiplying the sampling data S1 by the weight function, and a value calculated by integrating the extracted sampling data S2 while multiplying the sampling data S2 by the weight function. The difference D is an example of a value that is caused by an impedance of the switch 210 which is an analog switch.

The detection unit 250 compares the calculated difference D with a reference difference D based on the reference measurement result, and detects abnormality regarding the transmission line 13.

For example, the reference measurement result may be a measurement result obtained in the past by the measurement unit 220.

More specifically, the detection unit 250 stores, in the storage unit 260, a difference D calculated for each target period Tm, as a feature amount in the target period Tm. The detection unit 250 detects abnormality regarding the transmission line 13, based on a time-sequential change in difference D for each target period Tm.

Specifically, when the detection unit 250 has stored a newly calculated difference D in the storage unit 260, the detection unit 250 calculates a change amount of difference D per unit time, based on the stored difference D and on differences D calculated in the past and stored in the storage unit 260, and compares the calculated change amount with a predetermined threshold Th1. If the change amount of difference D per unit time is equal to or greater than the predetermined threshold Th1, the detection unit 250 determines that abnormality regarding the transmission line 13 has occurred. Furthermore, for example, the detection unit 250, based on the change amount of difference D per unit time, estimates a distance between the switch 210 and a position, in the transmission line 13, where the abnormality has occurred, and the number of abnormalities having occurred in the transmission line 13.

For example, the detection unit 250 detects abnormality regarding the transmission path, further based on a transmission direction, of the signal in the transmission path, which is determined based on the measurement result by the measurement unit 220.

More specifically, the detection unit 250, based on the sampling data S1, S2 in the storage unit 260, detects changes in voltage at the nodes N1, N2 in the transmission line 13, and determines a transmission direction of the signal passing the transmission line 13.

Specifically, the detection unit 250 determines whether the signal passing the transmission line 13 is a signal that is transmitted from the function unit 101 connected to the detection device 201 to another function unit 101, or a signal that is transmitted from another function unit 101 to the function unit 101 connected to the detection device 201.

When the detection unit 250, based on the sampling data S1, S2, has determined that the signal passing the transmission line 13 is a signal that is transmitted by the function unit 101 connected to the detection device 201, the detection unit 250 detects a transmission time of the signal transmitted by the function unit 101, based on sampling timings of the sampling data S1, S2.

Upon detecting the transmission time, the detection unit 250 sets a target period Tm and time observation windows with reference to the detected transmission time, extracts sampling data S1, S2 by using the set time observation windows, and integrates the sampling data S1, S2 while multiplying the sampling data S1, S2 by the predetermined weight function, thereby calculating a difference D.

The detection unit 250 outputs transmission time information indicating the detected transmission time to the communication unit 230.

Upon receiving the transmission time information from the detection unit 250, the communication unit 230 generates a frame in which the transmission time information and the ID, e.g., MAC address, of the detection device 201 are stored, and transmits the generated frame to another detection device 201 in the in-vehicle device group 40 via the transmission line 15.

For example, the detection unit 250 detects abnormality regarding the transmission path, further based on measurement results of a signal passing another transmission path, at a first node on the first end side of another switch 210 and a second node on the second end side of the other switch 210 which is provided to the other transmission path connecting a plurality of function units 101 to each other. More specifically, the detection unit 250 detects abnormality regarding the transmission line 13, further based on a measurement result regarding a switch 210 in the other detection device 201.

More specifically, when the communication unit 230 has received the frame in which the transmission time information and the MAC address of the transmission source are stored, from the other detection device 201 via the transmission line 15, the communication unit 230 acquires the transmission time information and the MAC address from the received frame, and outputs the acquired transmission time information and the MAC address to the detection unit 250.

Upon receiving the transmission time information and the MAC address from the communication unit 230, the detection unit 250 sets a target period Tm and time observation windows with reference to a transmission time indicated by the received transmission time information, and integrates sampling data S1, S2 extracted by using the set time observation windows while multiplying the sampling data S1, S2 by the predetermined weight function.

Moreover, the detection unit 250, based on the MAC address received from the communication unit 230, specifies a detection device 201 that is the transmission source of the frame and a function unit 101 that is the transmission source of the signal passing the transmission line 13.

When the function unit 101 as the transmission source of the signal has been specified, the detection unit 250 stores a feature amount of the signal, i.e., a difference D, into the storage unit 260 in association with the specified function unit 101. Then, the detection unit 250 detects abnormality regarding the transmission line 13, based on a time-sequential change in difference D stored for each function unit 101.

For example, when a change amount per unit time of a difference D corresponding to a certain function unit 101 exceeds the predetermined threshold Th1, the detection unit 250 determines that abnormality has occurred in the transmission line 13 between the certain function unit 101 and the function unit 101 connected to the detection device 201.

More specifically, for example, in a case where a change amount per unit time of a difference D corresponding to the control device 101A exceeds a predetermined threshold Tha and a change amount per unit time of a difference D corresponding to the control device 101E does not exceed a predetermined threshold The, the detection unit 250, of the detection device 201F to which the actuator 101F is connected, determines that abnormality has occurred in the transmission line 13 at a part, of a transmission path between the control device 101A and the actuator 101F, other than a part common to the transmission path between the control device 101E and the actuator 101F. The transmission path between the control device 101E and the actuator 101F is an example of a second transmission path.

Upon determining that abnormality has occurred in the transmission line 13, the detection unit 250 transmits determination information indicating the occurrence of abnormality in the transmission line 13 to a higher-order device inside the vehicle 1 or outside the vehicle 1 via the communication unit 230 and the transmission line 15. Moreover, the detection unit 250 transmits the determination information to other detection devices 201 via the communication unit 230 and the transmission line 15.

For example, the detection unit 250 in the detection device 201F combines determination information received from other detection devices 201 via the transmission line 15 and the communication unit 230 to estimate a position where abnormality has occurred in the transmission line 13.

For example, the detection unit 250 turns off the switch 210 by outputting a control signal to the control unit 240, based on the determination result. After the detection unit 250 has turned off the switch 210 by outputting the control signal to the control unit 240, the detection unit 250 transmits state information indicating that the switch 210 is in its off state, to other detection devices 201 in the in-vehicle device group 40 via the communication unit 230 and the transmission line 15.

The communication unit 230 may be configured to, for example, periodically acquire one or a plurality of pieces of sampling data S1, S2 stored in the storage unit 260 by the measurement unit 220, generate a frame in which the acquired sampling data S1, S2 and the ID, e.g., the MAC address, of the detection device 201 are stored, and transmit the generated frame to other detection devices 201 in the in-vehicle device group 40 via the transmission line 15.

[Modifications]

Figure 5:
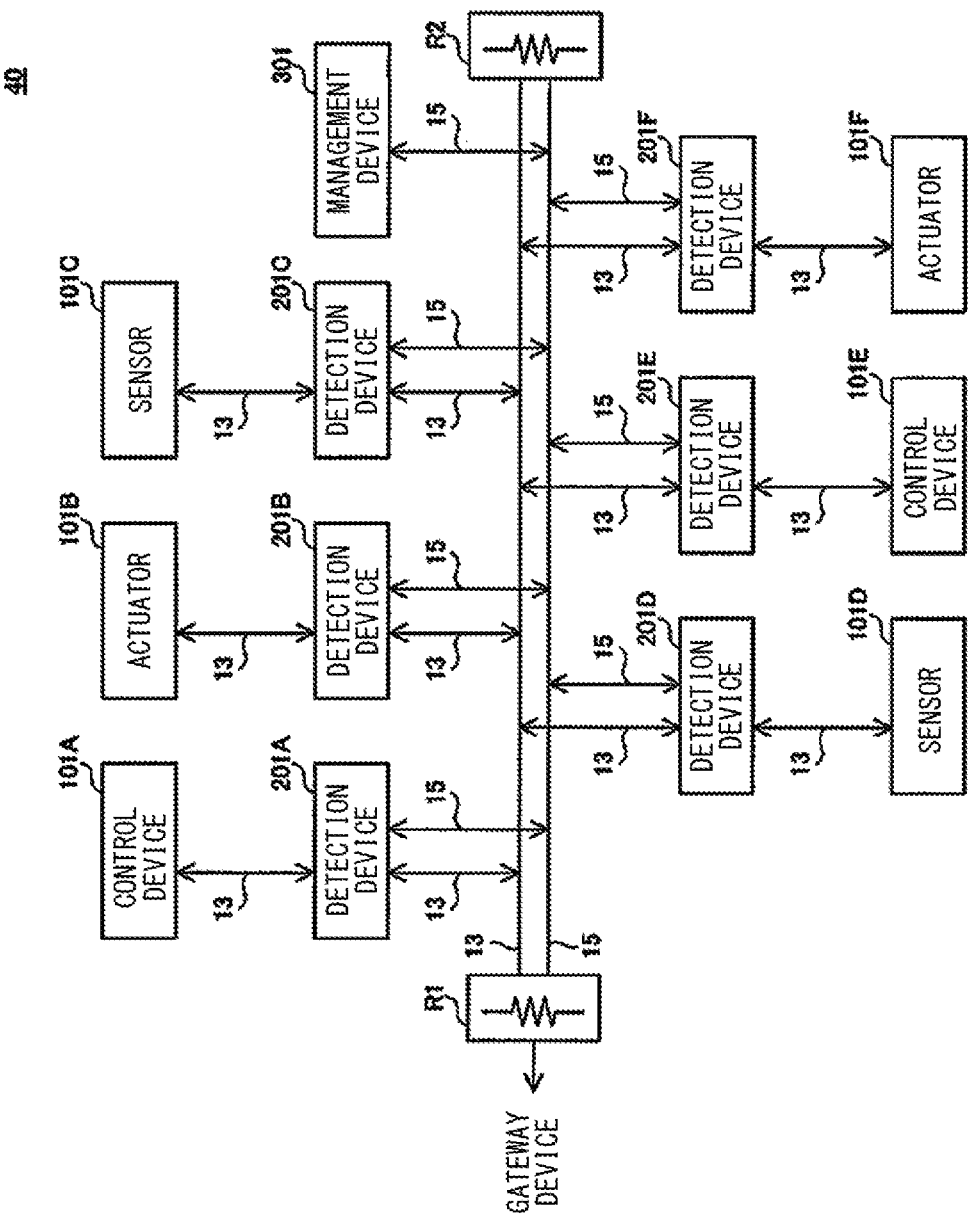
FIG. 5 shows a configuration of an in-vehicle device group according to a modification of the first embodiment of the present disclosure.

FIG. 5 shows a configuration of an in-vehicle device group according to a modification of the first embodiment of the present disclosure.

With reference to FIG. 5, an in-vehicle device group 40 includes detection devices 201, function units 101, and a management device 301 connected to a transmission line 15.

Figure 6:
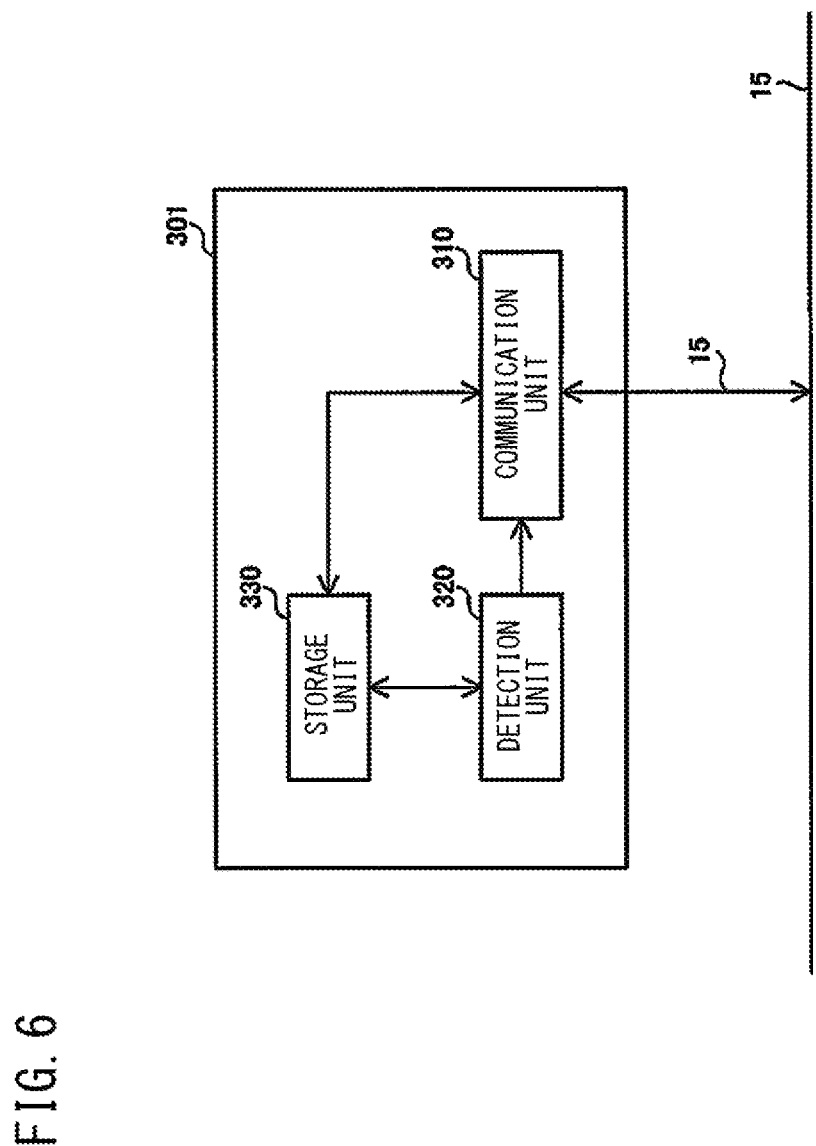
FIG. 6 shows a configuration of a management device according to a modification of the first embodiment of the present disclosure.

FIG. 6 shows a configuration of a management device according to the modification of the first embodiment of the present disclosure.

With reference to FIG. 6, the management device 301 includes a communication unit 310, a detection unit 320, and a storage unit 330. The communication unit 310 and the detection unit 320 are each realized by a processor such as a CPU or a DSP, for example. The storage unit 330 is a nonvolatile memory, for example.

The communication unit 310 is an example of an acquisition unit. The communication unit 310 acquires measurement results, of a signal passing through a transmission path, obtained at a node N1 on a first end side and a node N2 on a second end side of a switch 210 provided to the transmission path connecting a plurality of function units 101 to each other.

More specifically, the communication unit 230 in each detection device 201 transmits a frame including one or a plurality of pieces of sampling data S1, S2 to the management device 301 via the transmission line 15.

Upon receiving the frame, in which the one or the plurality of pieces of sampling data S1, S2 and the MAC address of the transmission source are stored, from the detection device 201 via the transmission line 15, the communication unit 310 in the management device 301 acquires the sampling data S1, S2 and the MAC address from the received frame, and stores the sampling data S1, S2 into the storage unit 330 in association with the MAC address.

The detection unit 320 compares a measurement result at the node N1 and a measurement result at the node N2, which are acquired by the communication unit 310, with a reference measurement result which is a measurement result for reference, and detects abnormality regarding the transmission path, based on the comparison result.

The detection unit 320 performs, for example, the same process as that performed by the detection unit 250 in the detection device 201, thereby detecting abnormality regarding the transmission line 13. More specifically, upon receiving transmission time information via the transmission line 15 and the communication unit 310, the detection unit 320 performs an arithmetic operation using the sampling data S1, S2 stored in the storage unit 330 to calculate a feature amount of the signal passing the transmission line 13.

Moreover, the detection unit 320, like the detection unit 250, determines a transmission direction of the signal in the transmission path, based on the measurement result acquired by the communication unit 310, and detects abnormality regarding the transmission path, further based on the determination result.

Upon determining that abnormality has occurred in the transmission line 13, the detection unit 320 transmits determination information indicating the occurrence of abnormality in the transmission line 13 to a higher-order device inside the vehicle 1 or outside the vehicle 1 via the communication unit 310 and the transmission line 15.

[Operation Flow]

Each device in the communication system according to the embodiment of the present disclosure includes a computer that includes a memory. An arithmetic processing unit such as a CPU in the computer reads out a program including a part or all of steps of the flowchart and sequence described below from the memory, and executes the program. The programs for the plurality of devices can be installed from outside, respectively. The programs for the plurality of devices are each distributed in a state of being stored in a storage medium.

Figure 7:
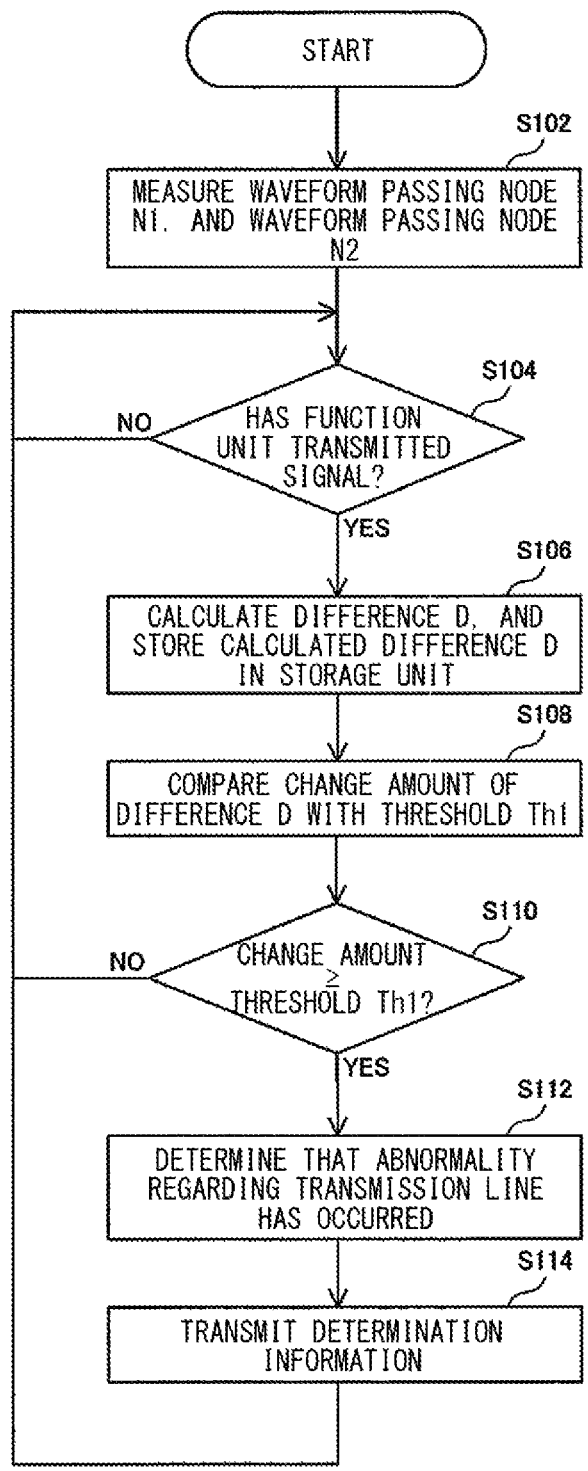
FIG. 7 is a flowchart describing an example of an operation procedure when the detection device according to the first embodiment of the present disclosure detects abnormality regarding a transmission line.

FIG. 7 is a flowchart describing an example of an operation procedure when a detection device according to the first embodiment of the present disclosure detects abnormality regarding a transmission line.

With reference to FIG. 7, first, a detection device 201 measures a waveform of a signal that passes the node N1 in the transmission line 13 and a waveform of the signal that passes the node N2 in the transmission line 13. More specifically, the detection device 201 samples voltages at the nodes N1, N2 according to a predetermined sampling cycle, and stores, in the storage unit 260, sampling data S1 of the voltage at the node N1 and sampling data S2 of the voltage at the node N2 (step S102).

Next, the detection device 201 waits for a signal transmitted from any function unit 101 in the in-vehicle device group 40 (NO in step S104). When a signal has been transmitted from a function unit 101 (YES in step S104), the detection device 201 sets a target period Tm and time observation windows with reference to a transmission time of the signal, calculates a difference D as an example of a feature amount of the signal passing the transmission line 13, and stores the difference D in the storage unit 260 (step S106).

Next, the detection device 201 compares the calculated difference D with a calculation result of difference D in the past stored in the storage unit 260. For example, the detection device 201 calculates a change amount of difference D per unit time, and compares the calculated change amount with a predetermined threshold Th1 (step S108).

When the change amount of difference D per unit time is less than the threshold (NO in step S110), the detection device 201 waits for a new signal transmitted from any function unit 101 (NO in step S104).

Meanwhile, when the change amount of difference D per unit time is equal to or greater than the threshold (YES in step S110), the detection device 201 determines that abnormality regarding the transmission line 13 has occurred (step S112).

Next, the detection device 201 transmits determination information indicating the occurrence of abnormality in the transmission line 13 to a higher-order device inside the vehicle 1 or outside the vehicle 1 via the transmission line 15 (step S114).

Next, the detection device 201 waits for a new signal transmitted from any function unit 101 (NO in step S104).

Figure 8:
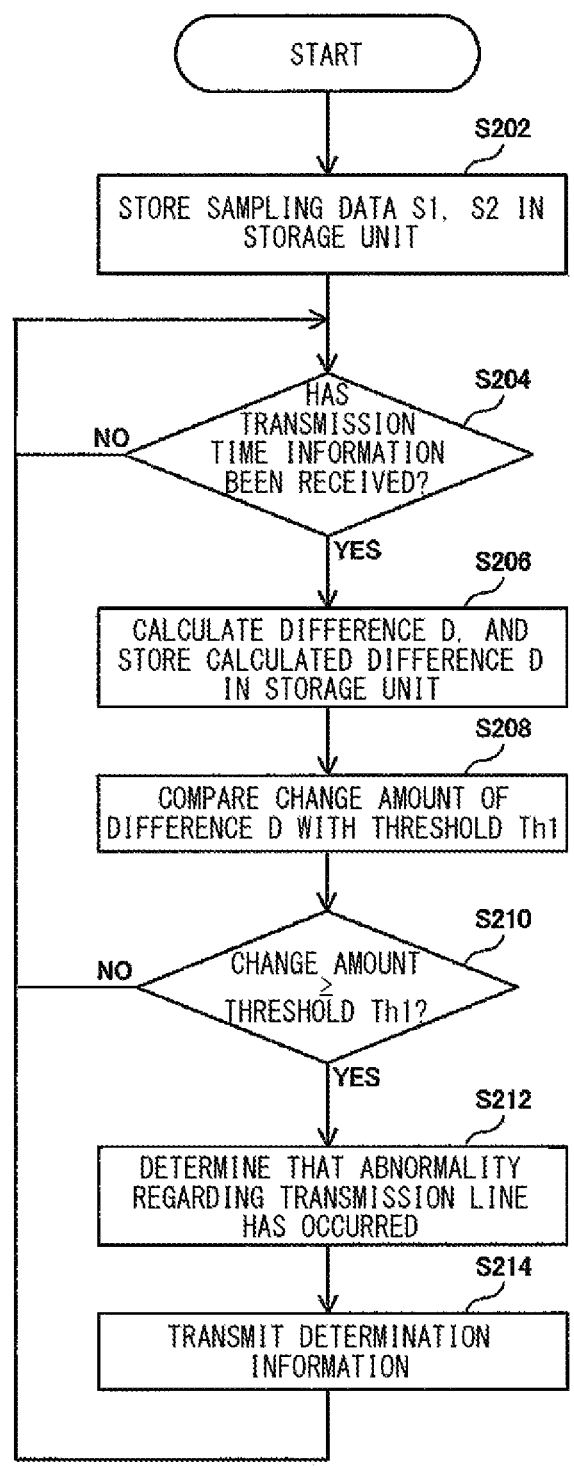
FIG. 8 is a flowchart describing an example of an operation procedure when the management device according to the modification of the first embodiment of the present disclosure detects abnormality regarding a transmission line.

FIG. 8 is a flowchart describing an example of an operation procedure when a management device according to a modification of the first embodiment of the present disclosure detects abnormality regarding a transmission line.

With reference to FIG. 8, first, the management device 301, for example, periodically receives a frame including sampling data S1, S2 from a detection device 201, acquires the sampling data S1, S2 from the received frame, and stores the sampling data S1, S2 in the storage unit 330 (step S202).

Next, the management device 301 waits for transmission time information from the detection device 201 (NO in step S204). Upon receiving transmission time information from a detection device 201 (YES in step S204), the management device 301 sets a target period Tm and time observation windows with reference to a signal transmission time, calculates a difference D as an example of a feature amount of the signal passing the transmission line 13, and stores the difference D in the storage unit 330 (step S206).

Next, the management device 301 compares the calculated difference D with a calculation result of difference D in the past stored in the storage unit 330. For example, the management device 301 calculates a change amount of difference D per unit time, and compares the calculated change amount with the predetermined threshold Th1 (step S208).

When the change amount of difference D per unit time is less than the threshold (NO in step S210), the management device 301 waits for new transmission time information from a detection device 201 (NO in step S204).

Meanwhile, when the change amount of difference D per unit time is equal to or greater than the threshold (YES in step S210), the management device 301 determines that abnormality regarding the transmission line 13 has occurred (step S212).

Next, the management device 301 transmits determination information indicating the occurrence of abnormality in the transmission line 13 to a higher-order device inside the vehicle 1 or outside the vehicle 1 via the transmission line 15 (step S214).

Next, the detection device 201 waits for new transmission time information from a detection device 201 (NO in step S204).

Figure 9:
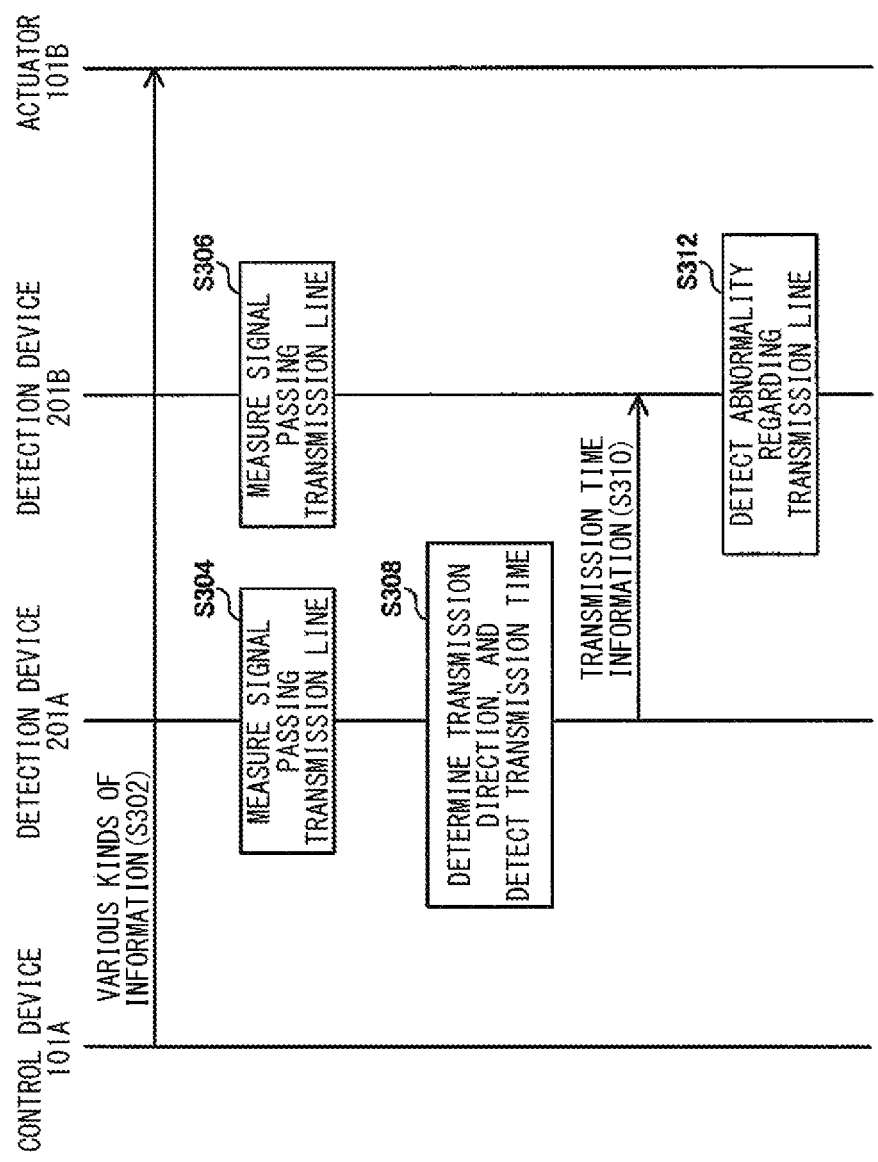
FIG. 9 shows an example of a sequence of an abnormality detection process in a detection system according to the first embodiment of the present disclosure.

FIG. 9 shows an example of a sequence of an abnormality detection process in a detection system according to the first embodiment of the present disclosure.

With reference to FIG. 9, first, the control device 101A transmits a signal including various kinds of information to the actuator 101B via the transmission line 13 (step S302).

Next, the detection device 201A measures a signal passing the transmission line 13, at a node N1 on a first end side of its switch 210 and at a node N2 on the second end side of its switch 210 (step S304).

Meanwhile, the detection device 201B measures a signal passing the transmission line 13, at a node N1 on the first end side of its switch 210 and at a node N2 on the second end side of its switch 210 (step S306).

Next, the detection device 201A determines a transmission direction of the signal in the transmission line 13, based on a measurement result regarding the signal passing the transmission line 13, and detects a transmission time of the signal by the control device 101A (step S308).

The detection device 201A transmits transmission time information indicating the detected transmission time, to the detection device 201B (step S310).

Next, the detection device 201B detects abnormality regarding the transmission line 13, based on the result of comparison between the measurement result of the signal passing the transmission line 13 and the measurement result in the past, and on the transmission time indicated by the transmission time information received from the detection device 201A (step S312).

In the detection device 201 according to the first embodiment of the present disclosure, the detection unit 250 calculates a change amount of difference D per unit time, based on differences D stored in the storage unit 260, and detects abnormality regarding the transmission line 13, based on the result of comparison between the calculated change amount and the predetermined threshold Th1. However, the present disclosure is not limited thereto. The detection unit 250 may compare the difference D calculated by using the measurement result from the measurement unit 220 with, for example, a predetermined threshold Th2 which has been set in advance based on a measurement result obtained by the measurement unit 220 in advance of shipment of the vehicle 1, and may detect abnormality regarding the transmission line 13, based on the comparison result.

In the detection device 201 according to the first embodiment of the present disclosure, the detection unit 250 determines a transmission direction of a signal in the transmission line 13, and detects abnormality regarding the transmission line 13, further based on the determination result. However, the present disclosure is not limited thereto. The detection unit 250 may not necessarily determine the transmission direction of the signal in the transmission line 13.

In the detection device 201 according to the first embodiment of the present disclosure, the detection unit 250 detects abnormality regarding the transmission line 13, further based on a measurement result regarding a switch 210 in another detection device 201. However, the present disclosure is not limited thereto. The detection unit 250 may detect abnormality regarding the transmission line 13 without using a measurement result regarding a switch 210 in another detection device 201.

In the detection device 201 according to the first embodiment of the present disclosure, the measurement unit 220 measures a waveform of the signal passing the node N1, N2 by sampling voltages at the node N1, N2 according to a predetermined sampling cycle. However, the present disclosure is not limited thereto. The measurement unit 220 may measure a waveform of the signal passing the node N1, N2 by sampling currents at the node N1, N2 according to a predetermined sampling cycle.

The management device 301 according to the modification of the first embodiment of the present disclosure is connected to the transmission line 15. However, the present disclosure is not limited thereto. The management device 301 may be provided outside the vehicle 1. In this case, for example, the communication unit 310 in the management device 301 acquires the measurement result in the detection device 210 via the gateway device 20 and the in-vehicle communication device 30. A part or the entirety of the functions of the management device 301 may be provided by cloud computing. That is, the management device 301 may be implemented by a plurality of cloud servers or the like.

Incidentally, there is a demand for a technology that can realize an excellent function regarding security in a network.

In order to meet the demand, in a detection device 201 according to the first embodiment of the present disclosure, a switch 210 is provided to a transmission path that connects a plurality of function units 101 to each other. A measurement unit 220 measures a signal that passes the transmission path, at a node N1 on the first end side of the switch 210 and at a node N2 on the second end side of the switch 210. A detection unit 250 compares a measurement result at the node N1 and a measurement result at the node N2, which are obtained by the measurement unit 220, with a reference measurement result which is a measurement result for reference, and detects abnormality regarding the transmission path, based on the comparison result.

A detection method according to the first embodiment of the present disclosure is a detection method used in a detection device 201 including a switch 210 provided to a transmission path that connects a plurality of function units 101 to each other. In this detection method, first, the detection device 201 measures a signal that passes a transmission path, at a node N1 on the first end side of the switch 210 and at a node N2 on the second end side of the switch 210. Next, the detection device 201 compares a measurement result at the node N1 and a measurement result at the node N2 with a reference measurement result which is a measurement result for reference, and detects abnormality regarding the transmission path, based on the comparison result.

In a management device 301 according to the first embodiment of the present disclosure, a communication unit 310 acquires a measurement result of a signal, passing a transmission path, which is measured at a node N1 on the first end side of a switch 210 and at a node N2 on the second end side of the switch 210 which is provided to the transmission path that connects a plurality of function units 101 to each other. A detection unit 320 compares a measurement result at the node N1 and a measurement result at the node N2, which are obtained by the communication unit 310, with a reference measurement result which is a measurement result for reference, and detects abnormality regarding the transmission path, based on the comparison result.

A detection method according to the first embodiment of the present disclosure is a detection method used in a management device 301. In this detection method, first, the management device 301 acquires a measurement result of a signal, passing a transmission path, which is measured at a node N1 on the first end side of a switch 210 and at a node N2 on the second end side of the switch 210 which is provided to the transmission path that connects a plurality of function units to each other. Next, the management device 301 compares a measurement result at the node N1 and a measurement result at the node N2 with a reference measurement result which is a measurement result for reference, and detects abnormality regarding the transmission path, based on the comparison result.

In the above configuration and method, abnormality regarding the transmission path is detected by using the signal measurement results at the node N1 on the first end side and the node N2 on the second end side of the switch 210. Therefore, for example, after startup of the network with validities of the function units 101 having been judged and the switches 210 having been turned on, connection of new equipment to the transmission path, physical abnormality of the transmission path itself, and the like can be more accurately detected by using a difference between the measurement result at the node N1 and the measurement result at the node N2.

Therefore, in the detection device, the management device, and the detection method according to the first embodiment of the present disclosure, it is possible to realize an excellent function regarding security of a network.

Next, another embodiment of the present disclosure will be described with reference to the drawings. In the drawings, the same or corresponding parts are denoted by the same reference signs, and descriptions thereof are not repeated.

Second Embodiment

In contrast to the detection system 401 according to the first embodiment, this second embodiment relates to a detection system 402 including a detection device 201G serving as a gateway device. The detection system 402 is identical to the detection system 401 of the first embodiment except for the content described below.

Figure 10:
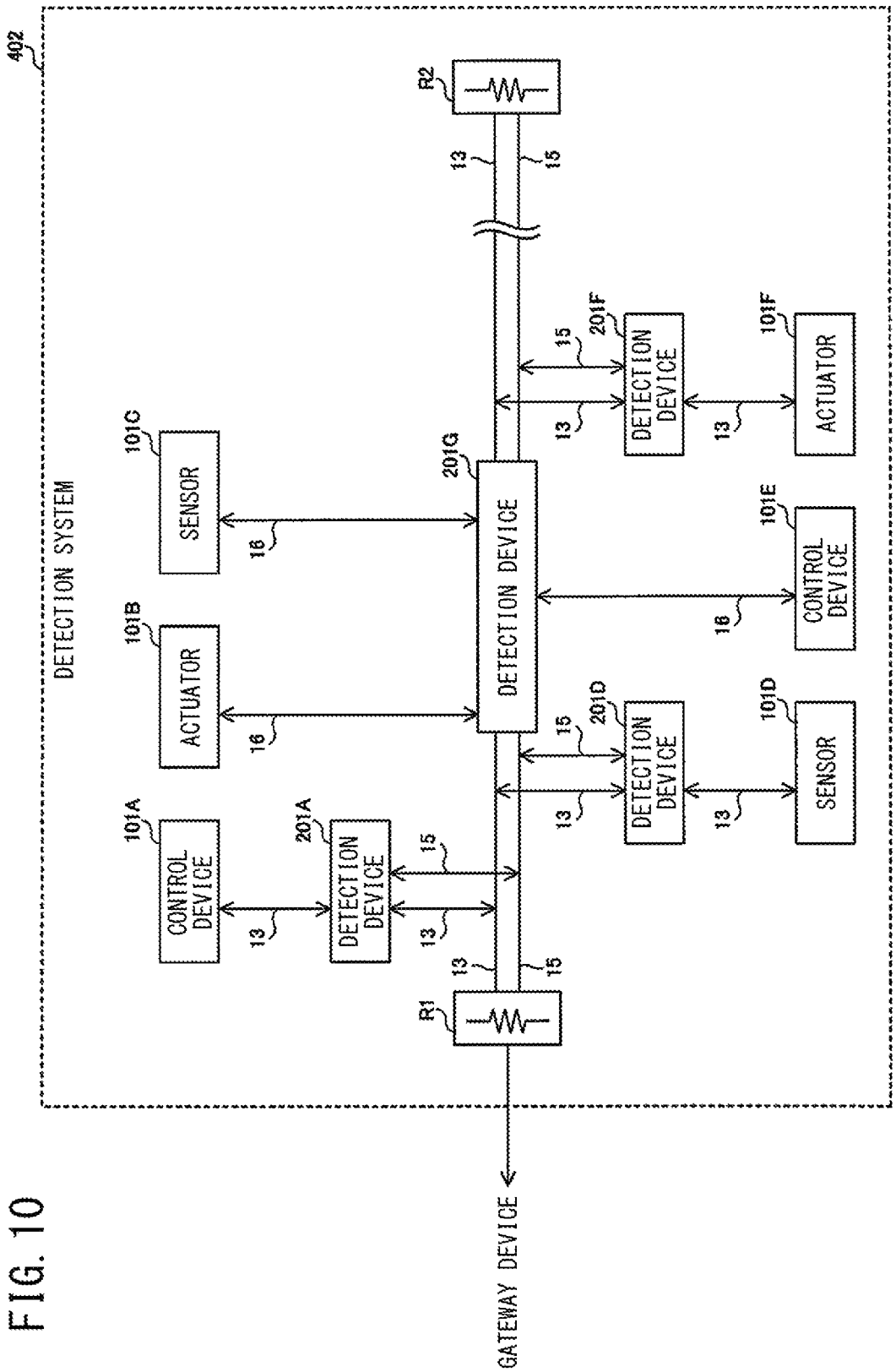
FIG. 10 shows a configuration of an in-vehicle device group according to a second embodiment of the present disclosure.

FIG. 10 shows a configuration of an in-vehicle device group according to the second embodiment of the present disclosure.

The in-vehicle device group 40 includes a detection system 402. The detection system 402 includes detection devices 201A, 201D, 201F connected to a transmission line 13 and a transmission line 15, a detection device 201G connected to the transmission line 13, the transmission line 15, and a transmission line 16, control devices 101A, 101E, actuators 101B, 101F, and sensors 101C, 101D. In the description of this embodiment, hereinafter, each of the detection devices 201A, 201D, 201F, 201G is also referred to as a detection device 201. The transmission lines 13, 15 have a plurality of branch lines, and detection devices 201A, 201D, 201F are connected to each branch line. The detection device 201G is provided on the transmission lines 13, 15.

The transmission line 16 is an Ethernet cable, for example. The transmission line 16 may be a transmission line according to a standard of CAN, FlexRay, MOST, LIN, or the like.

In the example shown in FIG. 10, the control device 101A is connected to the detection device 201A via the transmission line 13, the sensor 101D is connected to the detection device 201D via the transmission line 13, the actuator 101F is connected to the detection device 201F via the transmission line 13, and the actuator 101B, the sensor 101C, and the control device 101E are connected to the detection device 201G via the transmission line 16.

[Detection Device]

Figure 11:
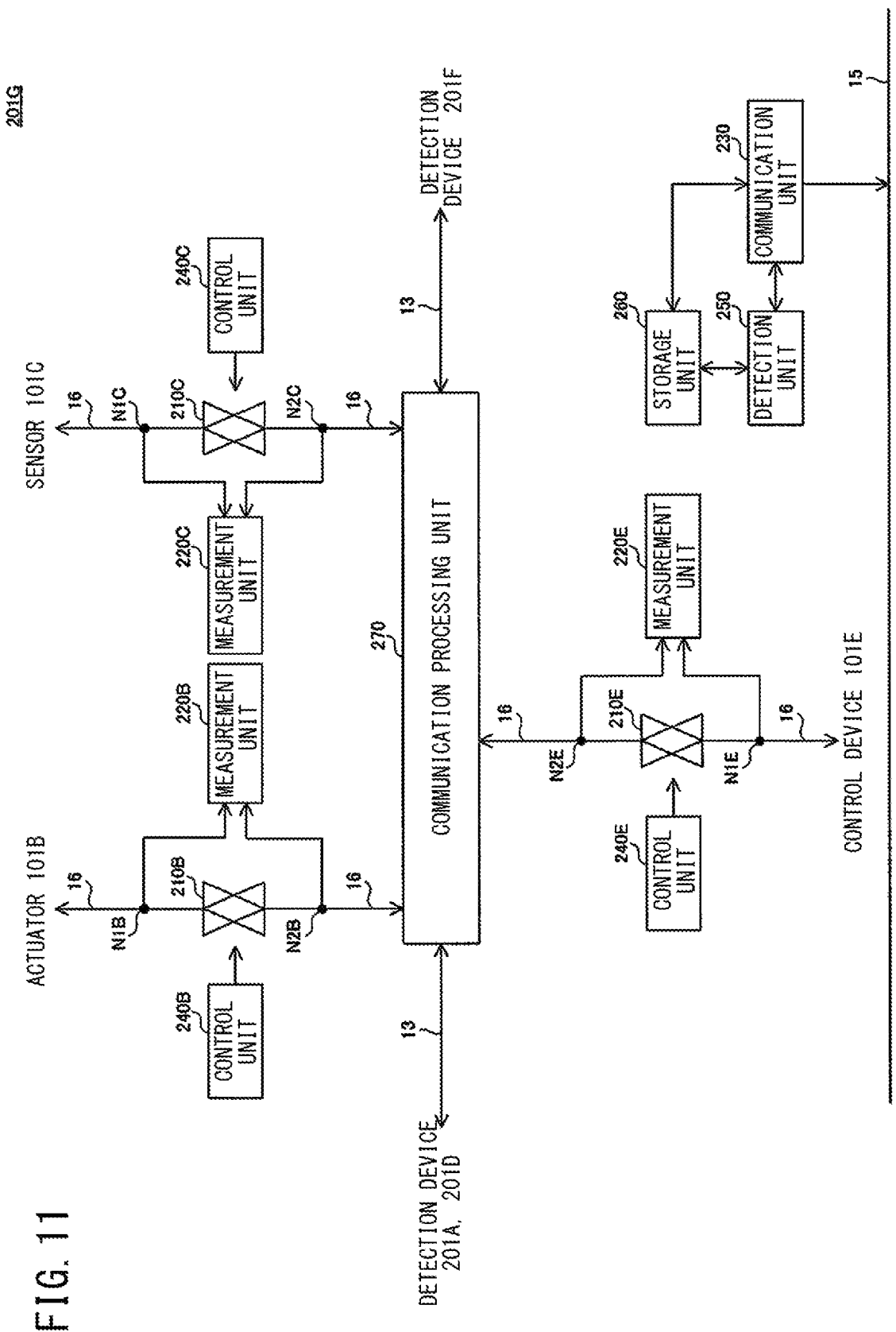
FIG. 11 shows a configuration of a detection device according to the second embodiment of the present disclosure.

FIG. 11 shows a configuration of a detection device according to the second embodiment of the present disclosure. FIG. 11 shows the configuration of the detection device 201G.

With reference to FIG. 11, the detection device 201G includes switches 210B, 210C, 210E, measurement units 220B, 220C, 220E, a communication unit 230, control units 240B, 240C, 240E, a detection unit 250, a storage unit 260, and a communication processing unit 270.

The measurement units 220B, 220C, 220E, the communication unit 230, the control unit 240, the detection unit 250, and the communication processing unit 270 are each realized by a processor such as a CPU or a DSP, for example. The storage unit 260 is a nonvolatile memory, for example.

The communication processing unit 270 performs a relay process. The communication processing unit 270 is an L2 switch, for example. More specifically, upon receiving a frame from a certain function unit 101 via the corresponding transmission line 16, the communication processing unit 270 transmits the received frame to a destination function unit 101 via the corresponding transmission line 16, or the corresponding transmission line 13 and detection device 201. Moreover, upon receiving a frame from a certain function unit 101 via the corresponding detection device 201 and transmission line 13, the communication processing unit 270 transmits the received frame to a destination function unit 101 via the corresponding transmission line 16, or the corresponding transmission line 13 and detection device 201.

A first end of a switch 210B is connected to the actuator 101B via the transmission line 16, and a second end of the switch 210B is connected to the communication processing unit 270 via the transmission line 16. A first end of a switch 210C is connected to the sensor 101C via the transmission line 16, and a second end of the switch 210C is connected to the communication processing unit 270 via the transmission line 16. A first end of the switch 210E is connected to the control device 101E via the transmission line 16, and a second end of the switch 210E is connected to the communication processing unit 270 via the transmission line 16.

[Measurement Unit]

The measurement unit 220B measures a waveform of a signal that passes a node N1B in the transmission line 16 to which the first end of the switch 210B is connected, and a waveform of the signal that passes a node N2B in the transmission line 16 to which the second end of the switch 210B is connected. The measurement unit 220C measures a waveform of a signal that passes a node N1C in the transmission line 16 to which the first end of the switch 210C is connected, and a waveform of the signal that passes a node N2C in the transmission line 16 to which the second end of the switch 210C is connected. The measurement unit 220E measures a waveform of a signal that passes a node N1E in the transmission line 16 to which the first end of the switch 210E is connected, and a waveform of the signal that passes a node N2E in the transmission line 16 to which the second end of the switch 210E is connected.

The measurement unit 220B stores, in the storage unit 260, sampling data S1B of voltage at the node N1B and sampling data S2B of voltage at the node N2B. The measurement unit 220C stores, in the storage unit 260, sampling data S1C of voltage at the node N1C and sampling data S2C of voltage at the node N2C. The measurement unit 220E stores, in the storage unit 260, sampling data S1E of voltage at the node N1E and sampling data S2E of voltage at the node N2E.

[Detection Unit]

The detection unit 250 compares a measurement result at the node N1B and a measurement result at the node N2B, which are obtained by the measurement unit 220B, with a reference measurement result which is a measurement result for reference, and detects abnormality regarding the transmission path, based on the comparison result. Moreover, the detection unit 250 compares a measurement result at the node N1C and a measurement result at the node N2C, which are obtained by the measurement unit 220C, with the reference measurement result as the measurement result for reference, and detects abnormality regarding the transmission path, based on the comparison result. Moreover, the detection unit 250 compares a measurement result at the node N1E and a measurement result at the node N2E, which are obtained by the measurement unit 220E, with the reference measurement result as the measurement result for reference, and detects abnormality regarding the transmission path, based on the comparison result.

More specifically, the detection unit 250 extracts, out of the sampling data S1B, S2B, a plurality of pieces of sampling data S1B, S2B in the respective time observation windows, and integrates the extracted sampling data S1B, S2B while multiplying the sampling data S1B, S2B by a predetermined weight function. Moreover, the detection unit 250 extracts, out of the sampling data S1C, S2C, a plurality of pieces of sampling data S1C, S2C in the respective time observation windows, and integrates the extracted sampling data S1C, S2C while multiplying the sampling data S1C and S2C by the predetermined weight function. Moreover, the detection unit 250 extracts, out of the sampling data S1E, S2E, a plurality of pieces of sampling data S1E, S2E in the respective time observation windows, and integrates the extracted sampling data S1E, S2E while multiplying the extracted sampling data S1E, S2E by the predetermined weight function.

The detection unit 250 calculates a difference DB between a value calculated by integrating the extracted sampling data S1B while multiplying the data by the weight function, and a value calculated by integrating the extracted sampling data S2B while multiplying the data by the weight function. Moreover, the detection unit 250 calculates a difference DC between a value calculated by integrating the extracted sampling data S1C while multiplying the data by the weight function, and a value calculated by integrating the extracted sampling data S2C while multiplying the data by the weight function. Moreover, the detection unit 250 calculates a difference DE between a value calculated by integrating the extracted sampling data S1E while multiplying the data by the weight function, and a value calculated by integrating the extracted sampling data S2E while multiplying the data by the weight function.

The detection unit 250 stores, in the storage unit 260, the calculated differences DB, DC, DE as feature amounts in the target period Tm.

The detection unit 250 detects abnormality regarding the transmission line 13, based on a time-sequential change in each of the differences DB, DC, DE for each target period Tm.

When the detection unit 250 has detected abnormality regarding the transmission path, based on the comparison result regarding any of the switches 210B, 210C, 210E, the control units 240B, 240C, 240E turn off one or a plurality of switches out of the switches 210B, 210C, 210E.

More specifically, the detection unit 250, based on the determination result, outputs a control signal to at least one of the control units 240B, 240C, 240E, thereby turning off the corresponding switch.

For example, the detection unit 250 outputs a control signal to at least one of the control units 240B, 240C, 240E, regardless of the position where the abnormality has occurred, thereby turning off the corresponding switch. Specifically, in a case where an unauthorized access to the control device 101E by an unauthorized function unit 101 needs to be avoided, if a change amount of the difference DB per unit time is equal to or greater than a predetermined threshold, the detection unit 250 outputs a control signal to the control unit 240E to turn off the switch 210E. Thus, the control device 101E can be isolated from the transmission path, whereby an unauthorized access to the control device 101E by an unauthorized function unit 101 can be avoided.

Alternatively, the detection unit 250 outputs a control signal to at least one of the control units 240B, 240C, 240E, according to the position where the abnormality has occurred, thereby turning off the corresponding switch. Specifically, for example, if a change amount of the difference DB per unit time is equal to or greater than the predetermined threshold, the detection unit 250 outputs a control signal to the control unit 240B to turn off the switch 210B. Thus, the actuator 101B, which is likely to be an unauthorized function unit 101, can be isolated from the transmission path.

In the detection system 402 according to a modification of the second embodiment of the present disclosure, the actuator 101B, the sensor 101C, and the control device 101E are connected to the detection device 201G via the transmission line 16. However, the present disclosure is not limited thereto. In the detection system 402, the actuator 101B may be connected to the detection device 201G via the detection device 201B and the transmission line 16, the sensor 101C may be connected to the detection device 201G via the detection device 201C and the transmission line 16, and the control device 101E may be connected to the detection device 201G via the detection device 201E and the transmission line 16. The control units 240B, 240C, 240E in the detection device 201G may receive control information from another detection device 201 via the communication unit 230 in the detection device 201G, and may turn off the corresponding switches 210B, 210C, 210E according to the received control information.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A detection device comprising:
  a switch provided to a transmission path that connects a plurality of function units to each other;
  a measurement unit configured to measure a signal that passes the transmission path, at a first node on a first end side of the switch and at a second node on a second end side of the switch; and
  a detection unit configured to compare a measurement result at the first node and a measurement result at the second node, which are obtained by the measurement unit, with a reference measurement result which is a measurement result for reference, and detect abnormality regarding the transmission path, based on a result of the comparison, wherein
the switch is an analog switch, and
the measurement unit and the detection unit are each realized by a processor.

[Additional Note 2]

A detection device comprising:
a switch provided to a transmission path that connects a plurality of function units to each other;
a measurement unit configured to measure a signal that passes the transmission path, at a first node on a first end side of the switch and at a second node on a second end side of the switch; and
a detection unit configured to compare a measurement result at the first node and a measurement result at the second node, which are obtained by the measurement unit, with a reference measurement result which is a measurement result for reference, and detect abnormality regarding the transmission path, based on a result of the comparison, wherein
the reference measurement result is a measurement result obtained in the past by the measurement unit, and
the detection unit detects abnormality regarding the transmission path, based on a change amount per unit time of a difference between the measurement result at the first end and the measurement result at the second end.

[Additional Note 3]

A management device comprising:
an acquisition unit configured to acquire measurement results of a signal, which passes a transmission path, measured at a first node on a first end side of a switch and at a second node on a second end side of the switch, the transmission path connecting a plurality of function units to each other, the switch being provided to the transmission path; and
a detection unit configured to compare the measurement result at the first node and the measurement result at the second node, which are obtained by the acquisition unit, with a reference measurement result which is a measurement result for reference, and detect abnormality regarding the transmission path, based on a result of the comparison, wherein
the switch is an analog switch, and
the measurement unit and the detection unit are each realized by a processor.

[Additional Note 4]

A management device comprising:
an acquisition unit configured to acquire measurement results of a signal, which passes a transmission path, measured at a first node on a first end side of a switch and at a second node on a second end side of the switch, the switch being provided to the transmission path that connects a plurality of function units to each other; and
a detection unit configured to compare the measurement result at the first node and the measurement result at the second node, which are obtained by the acquisition unit, with a reference measurement result which is a measurement result for reference, and detect abnormality regarding the transmission path, based on a result of the comparison, wherein
the reference measurement result is a measurement result obtained in the past by the measurement unit, and
the detection unit detects abnormality regarding the transmission path, based on a change amount per unit time of a difference between the measurement result at the first end and the measurement result at the second end.

REFERENCE SIGNS LIST 1 vehicle
12 in-vehicle network
13 transmission line
14 transmission line
15 transmission line
20 gateway device
30 in-vehicle communication device
40 in-vehicle device group
101A, 101E control device
101B, 101F actuator
101C, 101D sensor
201 detection device
210 switch
220 measurement unit
230 communication unit
240 control unit
250 detection unit
260 storage unit
270 communication processing unit
301 management device
310 communication unit
320 detection unit
330 storage unit
401, 402 detection system
501 communication system

The invention claimed is:

1. A detection device comprising:
a switch provided to a transmission path that connects a plurality of function units to each other;
a measurement unit configured to measure a signal that passes the transmission path, at a first node on a first end side of the switch and at a second node on a second end side of the switch; and
a detection unit configured to
compare a measurement result at the first node and a measurement result at the second node, which are obtained by the measurement unit, with a reference measurement result which is a measurement result for reference, and
detect abnormality regarding the transmission path, based on a result of the comparison, wherein
the detection unit detects abnormality regarding the transmission path further based on a transmission direction of the signal in the transmission path, the transmission direction being determined based on the measurement result at the first node and the measurement result at the second node, such that:
upon determining that the transmission direction of the signal is from the first node of the switch to the second node of the switch, the detection unit detects abnormality regarding the transmission path in one way, and
upon determining that the transmission direction of the signal is from the second node of the switch to the first node of the switch, the detection unit detects abnormality regarding the transmission path in another way.

2. The detection device according to claim 1, wherein the reference measurement result is a measurement result obtained in the past by the measurement unit.

3. The detection device according to claim 1, wherein the detection unit detects abnormality regarding the transmission path, further based on measurement results, of a signal that passes a second transmission path, obtained at a first node on a first end side of a second switch and at a second node on a second end side of the second switch that is provided to the second transmission path that connects a plurality of function units to each other.

4. The detection device according to claim 1, including a plurality of the switches, and further including control units configured to control the respective switches, wherein
in a case where abnormality regarding the transmission path has been detected by the detection unit, based on the comparison result regarding any one of the respective switches, the control units turn off one or a plurality of switches among the respective switches.

5. A management device comprising:
an acquisition unit configured to acquire measurement results of a signal, which passes a transmission path, measured at a first node on a first end side of a switch and at a second node on a second end side of the switch, the transmission path connecting a plurality of function units to each other, the switch being provided to the transmission path; and
a detection unit configured to
compare the measurement result at the first node and the measurement result at the second node, which are obtained by the acquisition unit, with a reference measurement result which is a measurement result for reference, and
detect abnormality regarding the transmission path, based on a result of the comparison, wherein
the detection unit detects abnormality regarding the transmission path further based on a transmission direction of the signal in the transmission path, the transmission direction being determined based on the measurement result at the first node and the measurement result at the second node, such that:
upon determining that the transmission direction of the signal is from the first node of the switch to the second node of the switch, the detection unit detects abnormality regarding the transmission path in one way, and
upon determining that the transmission direction of the signal is from the second node of the switch to the first node of the switch, the detection unit detects abnormality regarding the transmission path in another way.

6. A detection method used in a detection device including a switch provided to a transmission path that connects a plurality of function units to each other, the method comprising:
measuring a signal that passes the transmission path, at a first node on a first end side of the switch and at a second node on a second end side of the switch; and
comparing a measurement result at the first node and a measurement result at the second node with a reference measurement result which is a measurement result for reference, and detecting abnormality regarding the transmission path, based on a result of the comparison, wherein
the abnormality regarding the transmission path is detected further based on a transmission direction of the signal in the transmission path, the transmission direction being determined based on the measurement result at the first node and the measurement result at the second node, such that:
upon determining that the transmission direction of the signal is from the first node of the switch to the second node of the switch, the abnormality regarding the transmission path is detected in one way, and
upon determining that the transmission direction of the signal is from the second node of the switch to the first node of the switch, the abnormality regarding the transmission path is detected in another way.

7. A detection method used in a management device, comprising:
acquiring measurement results of a signal, which passes a transmission path, measured at a first node on a first end side of a switch and at a second node on a second end side of the switch, the transmission path connecting a plurality of function units to each other, the switch being provided to the transmission path; and
comparing the measurement result acquired at the first node and the measurement result acquired at the second node with a reference measurement result which is a measurement result for reference, and detecting abnormality regarding the transmission path, based on a result of the comparison, wherein
the abnormality regarding the transmission path is detected further based on a transmission direction of the signal in the transmission path, the transmission direction being determined based on the measurement result at the first node and the measurement result at the second node, such that:
upon determining that the transmission direction of the signal is from the first node of the switch to the second node of the switch, the abnormality regarding the transmission path is detected in one way, and
upon determining that the transmission direction of the signal is from the second node of the switch to the first node of the switch, the abnormality regarding the transmission path is detected in another way.

8. A non-transitory computer-readable storage medium having, stored therein, a detection program used in a detection device including a switch provided to a transmission path that connects a plurality of function units to each other, the program causing a computer to function as:
a measurement unit configured to measure a signal that passes the transmission path, at a first node on a first end side of the switch and at a second node on a second end side of the switch; and
a detection unit configured to
compare a measurement result at the first node and a measurement result at the second node, which are obtained by the measurement unit, with a reference measurement result which is a measurement result for reference, and
detect abnormality regarding the transmission path, based on a result of the comparison, wherein
the detection unit detects abnormality regarding the transmission path further based on a transmission direction of the signal in the transmission path, the transmission direction being determined based on the measurement result at the first node and the measurement result at the second node, such that:
upon determining that the transmission direction of the signal is from the first node of the switch to the second node of the switch, the detection unit detects abnormality regarding the transmission path in one way, and
upon determining that the transmission direction of the signal is from the second node of the switch to the first node of the switch, the detection unit detects abnormality regarding the transmission path in another way.

* * * * *